Feb. 6, 1945. C. F. WALLACE 2,368,905
ANEROID BAROMETER MOVEMENT
Filed Sept. 24, 1941 3 Sheets-Sheet 1

INVENTOR.
Charles Frederick Wallace
BY Cooper, Kerr & Dunham
ATTORNEYS

Feb. 6, 1945.  C. F. WALLACE  2,368,905
ANEROID BAROMETER MOVEMENT
Filed Sept. 24, 1941  3 Sheets-Sheet 2
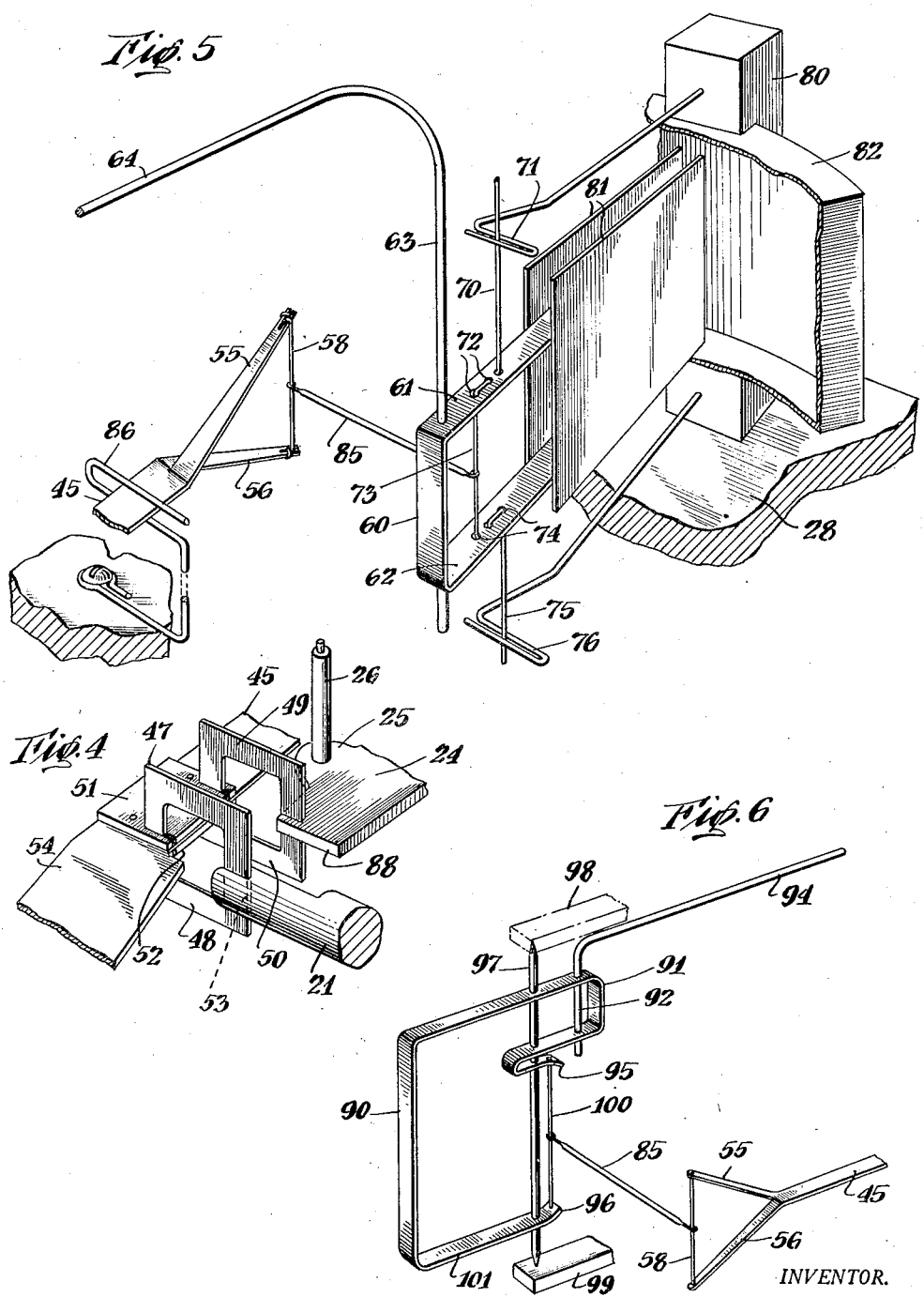
INVENTOR.
Charles Frederick Wallace
BY
Cooper, Kent & Dunham
ATTORNEYS

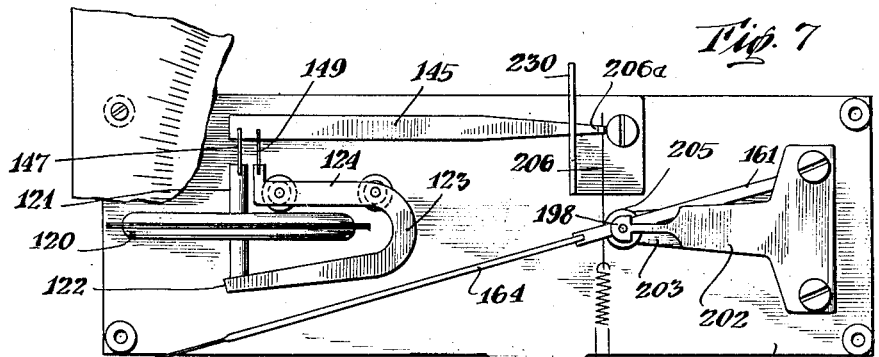
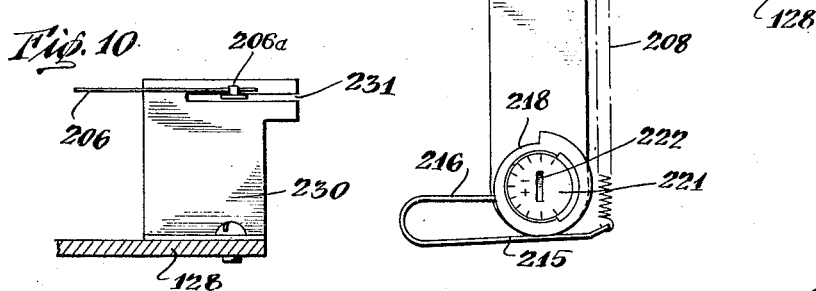
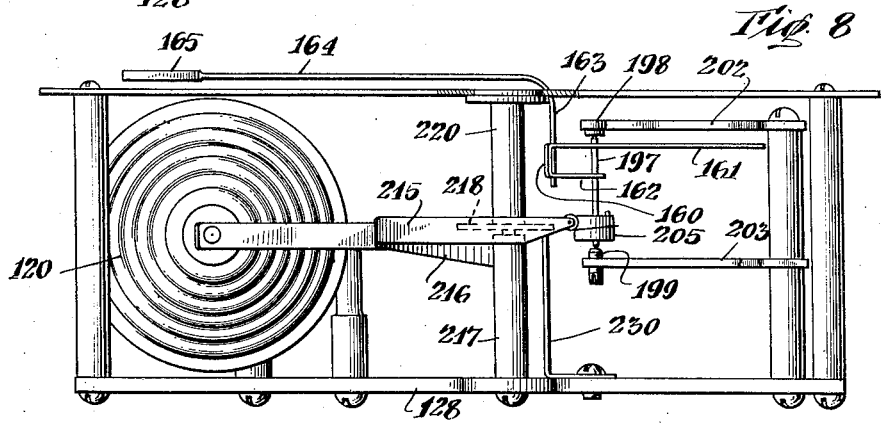
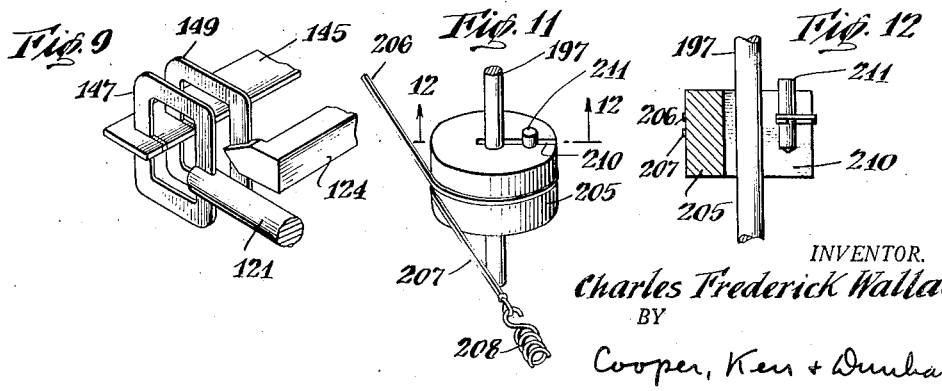

Patented Feb. 6, 1945

2,368,905

UNITED STATES PATENT OFFICE 2,368,905

ANEROID BAROMETER MOVEMENT

Charles Frederick Wallace, Westfield, N. J., assignor to Wallace & Tiernan Products, Inc., Belleville, N. J., a corporation of New Jersey Application September 24, 1941, Serial No. 412,121

15 Claims. (Cl. 73—386)

This invention relates to movements for apparatus of the character of aneroid barometers and altimeters, and more particularly to arrangements for translating small displacements of the pressure-sensitive bellows of such devices into adjustments of suitable indicating or recording means, e. g., a pointer or a corresponding element in recording devices of the depressor bar type.

An important object of the invention is to provide new and improved structure for greatly improving the sensitivity and fidelity of response in an aneroid barometer and to provide structure which is at the same time rugged, reliable and of a relatively simple mechanical character. A further object is to provide apparatus of the character described, which is substantially free of the difficulties resulting from back lash or play, however small, and resulting from the friction of bearings or other bearing surfaces. More specifically, a special object of the invention is to provide an instrument which immediately responds to atmospheric or like pressure changes, without the need for tapping or other agitation customarily required in meters of this type to make the pointer adopt a position corresponding to a changed condition of the pressure-sensitive bellows.

Further objects include the provision of apparatus of the character stated which is more sensitive, more accurate and generally more satisfactory in various respects; and other objects include those hereinafter stated or apparent and likewise those incidental to the structure of the invention, which may be conveniently explained by reference to certain presently preferred physical embodiments thereof set forth by way of example in the accompanying drawings.

Referring to the drawings:

Fig. 4 is a fragmentary perspective view showing the connection of the bellows elements;

Fig. 5 is a fragmentary perspective view of the swinging structure of the indicator arm and its immediate connections;

Fig. 6 is a perspective view of a somewhat modified structure of indicator arm assembly;

Figs. 7 and 8 are respectively a plan view with a part of the scale and cover cut away, and an elevation, of the barometer structure embodying further modifications;

Fig. 9 is a fragmentary perspective view of the connections of the bellows elements of the device of Figs. 7 and 8;

Figure 1:
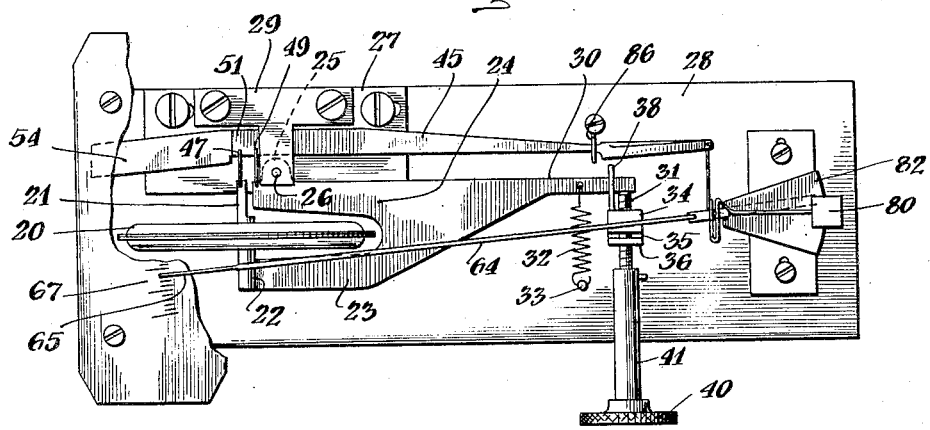
Fig. 1 is a plan view, with a portion of the scale cut away, of an aneroid barometer embodying the present invention.

Fig. 10 is an elevational view, taken endwise of Fig. 7, of an operating lever guard arrangement; and Figs. 11 and 12 are respectively a fragmentary perspective view and a section on line 12—12 of Fig. 11, showing the driving drum of the swinging indicator assembly of Figs. 7 and 8.

Referring to Figs. 1 to 5 inclusive, the apparatus there depicted by way of illustration, comprises an exhausted elastic metal box 20 (conveniently identified, in a generic sense, as a bellows) of a type suitable for an aneroid barometer, and having annularly corrugated side faces, as shown, which move slightly toward or away from each other in response to changes in pressure of the surrounding air or gas. One side face carries a central outwardly extending post or rod 21, and the opposite face is centrally mounted at 22 to the inside of one arm of a U-shaped supporting member 23. As shown, the member 23 surrounds one side of the bellows and its other arm 24 extends to a position close to the post 21. One side of the arm 24, conveniently adjacent its outer end, has a lug 25 which is mounted on a vertical shaft 26 (see Figs. 3 and 4), journalled at its bottom end in a suitable bearing plate 27 secured to the base member 28 of the instrument, and at its upper end in an opposite bearing plate 29 carried on suitable supporting posts as shown.

By virtue of the assembly just described, the bellows 20 and the associated parts including the member 23 are adapted to swing about the pivots of the shaft 26. To maintain this assembly in a desired adjusted position, the member 23 includes an extension 30 which at a point preferably remote from the shaft 26 abuts the end of an adjusting screw 31 and is held against the screw by the preferably substantial tension of a coil spring 32 extending from the arm 30 to a suitable retaining post 33. The adjusting screw 31 is threaded and carried in a transverse aperture of a block or post 34, the latter being conveniently provided with a vertical slot 35 transversely intersecting the path of the screw and providing, in effect, a springlike strip 36 (threaded on the screw) which may be biassed to retain the screw 31 firmly against accidental rotative displacement, as well as against any play longitudinally of its axis. The arm 30 is guided between a pair of vertically spaced pins 38, 38 extending from the block 34, and rotative adjustment of the screw 31 is effected by a knob 40 carried on a shaft 41 to which the screw extends. It will now be seen that the position of the bellows and member 23 is dependent upon the adjustment of the screw by the knob 40, and that by virtue of the spring 32 and cooperating instrumentalities, the bellows assembly will be firmly retained in any adjusted position.

The structure includes an operating lever 45, which is of substantial length and which at one end is connected, preferably by flexible but securely fastened connections affording substantially the sole support for the lever without bearings or bearing surfaces, to the opposite sides of the barometer bellows. Referring particularly to Figs. 1 and 4, it will be seen that the lever 45 may comprise a horizontally disposed strip or thin bar which extends in proximity to the adjacent ends of the post 21 and the arm 24. The last mentioned elements are respectively connected to spaced points on the lever member 45 by flexible, resilient connecting means of the preferred character described above.

For example, one suitable form of such means may comprise the cooperating, edgewise-disposed, U-shaped strips or hinges 47, 48 intermediate the post 21 and the lever 45, and the similar strips 49, 50 intermediate the end of the arm 24 and a point on the lever 45 spaced a short distance longitudinally of the lever from the point of attachment of the strips 47, 48. A convenient construction is to make each set of connecting strips in the integral form of a flat open frame (of square or other suitable configuration) which is cut or stamped from very thin but stiffly resilient sheet metal and which is broken at one side to engage the lever and is there secured in suitable slots in mounting plates 51, 52 which are riveted or otherwise fastened to opposite sides of the lever. The other side of each connecting square is anchored in a suitable notch in its control member (i. e., the post 21 or arm 24), as indicated by the dotted lines 53 in Fig. 4. If desired, the lever may have a balancing portion 54 extending on the opposite side of the connections 47—50 from the longer portion of the lever which operates the indicating instrumentalities as hereinafter described. It will be understood that the connecting means 47—48 and 49—50 are preferably of sufficient resilience to support the lever assembly, and while thin and flexible to afford full translation of displacements of the post 21 into horizontal swing, are sufficiently short and strong to avoid buckling or bending other than as is involved in actual translation of bellows movement.

Figure 3:
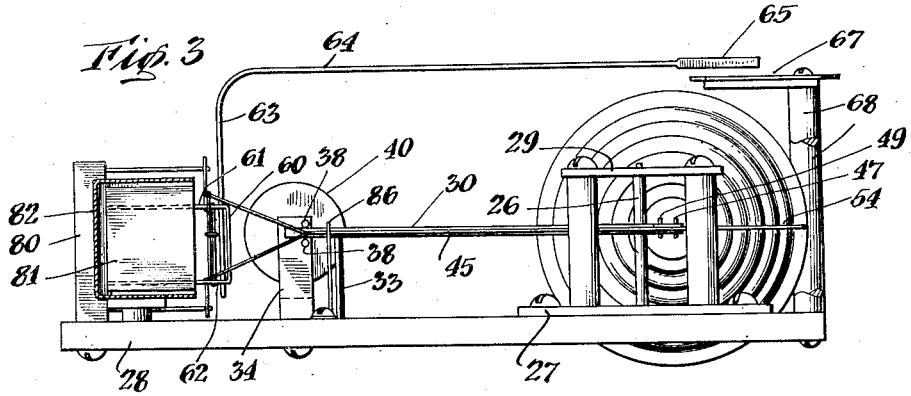

The outer end of the lever 45 is bifurcated, in effect vertically, i. e., at right angles to its path of movement, so as to provide the upwardly and downwardly extending arms 55, 56 as shown in Figs. 3 and 5. Between the ends of the arms there is stretched a thin wire or ribbon filament 58, for transmitting movement to the pointer assembly now to be described; the arms 55, 56 having some resilience so that the ribbon or wire 58 is maintained under tension at all times.

Figure 2:
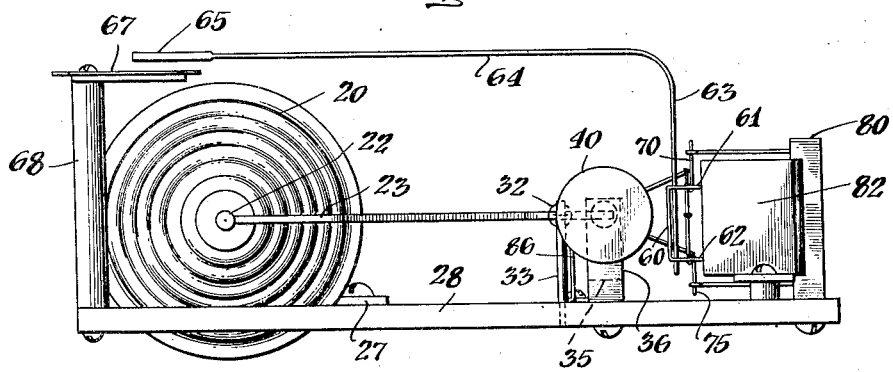
Figs. 2 and 3 are respectively side elevations of opposite sides of the apparatus shown in Fig. 1, with a few parts cut away or in section, as will be apparent.

The indicator arm assembly comprises a U-shaped supporting strip having a flat vertical portion 60 and vertically spaced, horizontally extending arms 61, 62 (see Fig. 5). A rod or stiff wire 63 extends through and is fastened in suitable apertures in the arms 61, 62 adjacent the end portion 60 of the U-shaped frame, and to provide a desired indicating pointer, the rod 63 is bent at a right angle into a long horizontal portion 64 terminating in a thin pointer blade 65, disposed to sweep across a scale 67 which is mounted on supporting posts 68 from the base 28 (Figs. 1 to 3).

The assembly of the pointer arm 63—64 and the frame 60—62 is mounted to swing about an axis in the plane of the arm, by means, for example, of a wire suspension. A particularly simple but effective arrangement to that end comprises a vertical wire or filament having an upper portion 70 fastened at the top in a clamp 71 and extending down to the frame arm 61, where the wire is laced through the apertures 72, and thence passes down to the lower arm 62 so as to have a portion 73 offset from the axis of rotation. The wire is laced through the similar apertures 74 in the lower arm 62 and thence extends downwardly at 75, and in alignment with the upper reach 70, to a lower clamp 76. It will be seen that the indicator arm assembly is thus suspended between the clamps 71, 76 to swing about the axis of the wire portions 70, 75. The clamps may be relatively heavy spring-wire construction, as shown, and carried by a suitable supporting block 80 mounted on the base 28.

In many cases it will be found desirable to damp the movements of the indicator assembly, and to that end a pair of damping vanes 81, 81 are carried by the outer ends of the arms 61—62, and arranged to swing in a fan-shaped enclosure or box 82, which may be mounted against the block 80. In this fashion the cushioning effect, on the vanes, of the substantially confined air in the box 82 provides damping action for swinging movement of the pointer.

To connect the pointer assembly with the lever 45, a thin rigid connecting member 85 is secured at one end to a central point of the wire 58 and at the other end to a central point of the wire section 73. Although the member 85 may be made in various ways, an efficient construction is of light metal tubing having its ends flattened to facilitate the desired fastening to the respective wires of the lever and the indicator assembly. It will be understood that the connection of the member 85 to the wires 58 and 73, and likewise the supporting connections of the outer ends of the wires 58 and 70, 75, involve actual fastening, as by welding or pressure rather than by a pivotal connection or the like.

In order to prevent derangement or damage during handling of the instrument, and particularly to prevent displacement of the lever 45 by mechanical shock, a guard structure 86 (Figs. 1 and 3) is mounted on the base, adjacent the outer end of the lever 45, and comprises a stiff wire hook, as shown, with horizontal arms disposed slightly above and slightly below the lever. It will be understood that ordinarily the lever does not come in contact with the guard structure, but swings free; yet any vibration or distortion of the lever, e. g., as the instrument is moved about, will be restrained by the guard device so as to prevent disalignment or derangement of the lever or its related instrumentalities.

The operation of the apparatus may now be readily understood. Changes in pressure will produce slight inward or outward movements of the post 21, i. e., movements in a direction parallel, so to speak, to the end edge 88 of the arm 24; and through the flexible connecting structure described, the lever 45 is swung one way or the other in a plane parallel to the base 28. By virtue of the length of the lever arm this movement is greatly magnified at its bifurcated outer end, and is transmitted through the connecting member 85 to the indicator assembly at a point offset from the axis of the latter. As a result, the indicator assembly is swung in one direction or another, in proportion to the mutual displacement of the sides of the bellows.

The transmission of force or displacement is immediate throughout the structure; there are no bearings, or other friction producing surfaces, in the connection at either end of the lever, nor is there any device at either end which is susceptible of undesirable play or back lash of any sort. It will be appreciated that the necessary displacements of an angular character between the lever and member 85, and between the latter and the pointer assembly, are encompassed through the flexibility of the connections, e. g., torsionally in the supporting wire portions 58, 73—and indeed likewise in the case of the wire suspension 70, 75, for the indicator assembly. The response of the instrument is thus positive and immediate, and in contradistinction to many prior types of barometers, there is no need to tap or otherwise to agitate the apparatus in order to dislodge one or more parts of the movement and permit the pointer to assume the proper position. Calibration of the instrument, moreover, is readily accomplished at any time by simple adjustment of the knob 40, whereby the entire movement is shifted, in effect, with respect to the scale.

The sensitivity of the device is remarkable: for instance, in the case of one such device having an operating lever 45 with an effective length of about 3 inches and a pointer arm about 4 inches long, simply raising or lowering the entire instrument for about five feet caused the pointer to move immediately and of its own accord through a scale division of approximately 0.1 of an inch. The apparatus is equally sensitive to transient pressure changes, and registers substantial deflection of the pointer, for example, when a person walks by the instrument or when a door is opened or closed to a room where the instrument may happen to be. In these and other respects the advantages of the structure are very substantial and are believed to represent characteristics of operation and sensitivity hitherto unattained in instruments having anything like the simplicity of mechanical movement herein shown—and indeed unattained in aneroid barometers generally.

In Fig. 6, a somewhat modified form of indicator assembly is shown. Here the supporting frame comprises a strip of conveniently thin sheet metal bent to have a rearwardly extending loop 90, a smaller forwardly extending loop 91 which carries the vertical portion 92 of the pointer arm 94 (conveniently in the same manner that the pointer arm 63—64 is mounted to the frame 60—62 in Fig. 5), and a pair of short forwardly extending arms 95, 96. Although the structure may be suspended on wires in the manner of the device of Figs. 1 to 5, another suitable arrangement includes the rigid vertical shaft 97, conveniently passing through the several horizontal portions of the frame as shown, and disposed for free rotation about its axis in suitable upper and lower bearings 98, 99. The wire 100 is stretched between the arms 95, 96, and to the wire thus offset from the axis of the assembly there is connected the member 85 which is adapted to transmit movement from the lever 45 by means of structure which may, for instance, be the same as that shown in Figs. 1 to 5.

It will now be readily appreciated that the arrangement of Fig. 6, which may be embodied in a complete barometer and include other instrumentalities as in the case of Figs. 1 to 5 inclusive, operates in substantially the same manner as the structure of the preceding figures. In the device of Fig. 6, the strip portions 95 and 96 may be bent up or down, i. e., so as to bring their ends toward or away from each other, to adjust the eccentricity of the member 85 with respect to the axis (shaft 97) of the pointer assembly. Conveniently, at least the lower horizontal portion 101 of the frame may be adapted to slide vertically of the shaft 97, and there should preferably be spring tension in the frame tending to force the arm portion 101—96 downwardly, or more generally stated, such mounting of the frame to the shaft and such spring tension in the frame, as will keep the wire 100 under suitable tension in any desired position of adjustment.

Referring now to Figs. 7 to 12 inclusive, this form of the apparatus is shown as including an elastic box or bellows 120 carrying on one side a post 121, and having its other side mounted to the end 122 of a U-shaped member 123, in an arrangement generally similar to correspondingly numbered parts of Figs. 1 to 4. For simplicity of illustration, and as it may indeed be omitted in some cases, no structure for adjustment of the U-shaped member 123 is shown and the member is illustrated as mounted directly to the base 128 on suitable posts; but it will be understood that adjusting means, for example of the character shown in Figs. 1-4, may be included if desired.

A lever member 145 is connected to the post 121 and adjacent arm 124 of the U-shaped member 123, by suitable means, for instance of similar character to the corresponding connections of lever 45 in the first-described embodiment. As will be seen in Figs. 7 and 9, such connection may comprise the flat, square-shaped resilient hinge members 147 and 149, which are arranged in the same way as in Figs. 1-4, and which may be fastened the same way or (like those of Figs. 1-4) in the simpler alternative fashion shown in Fig. 9, where each square member is left entirely integral and is soldered or otherwise secured in a suitable notch in the lever 145.

The indicator assembly includes a stiff wire indicator member having a horizontal pointer portion 164 and a vertical mounting portion 163 secured in a U-shaped frame 160, 161, 162, all arranged in a fashion generally similar to the correspondingly numbered parts of Fig. 5.

Although no damping vanes and associated instrumentalities are shown in Figs. 7 or 8 (or in Fig. 6), it will be understood that if desired such means may be embodied in these structures as well.

The frame 160—162 is carried on a thin vertical shaft 197 having pointed ends disposed in appropriate bearings 198, 199, which are respectively carried at the ends of the horizontal arms 202, 203 mounted on a post from the base 128. For adjustment of bearing pressure, one of the bearings, such as bearing 199, comprises a screw member threaded for vertical adjustment in the arm 203.

For transmission of movement to the indicator assembly, a small drum 205 (see specifically Figs. 11 and 12) is mounted on the shaft 197. A wire 206, fastened to the outer end 206a (Fig. 7) of the lever 145, extends to and conveniently partially around the drum 205, and is there fastened to the latter. Another wire 207, similarly fastened to the drum, extends around it in the other direction, and is secured to one end of a long coil spring 208. As will be seen in Figs. 11 and 12, a convenient arrangement for securing the wires 206, 207, to the drum 205 comprises a vertical slot 210 extending somewhat more than half way across the diameter of the drum, and suitably recessed to receive and grip not only the shaft 197, but also a clamping pin 211, so that the ends of the wires 206, 207 may be snubbed around the pin 211 and thereby firmly anchored by the clamping action of the slot 210 on the pin.

The outer end of the long spring 208 is secured to the end of one arm 215 of a horizontally disposed, U-shaped spring strip having its other arm 216 (inclined somewhat downwardly to clear the associated instrumentalities as shown) fastened to an upright post 217 which is carried by the base 128. Conveniently journalled in the post 217 or otherwise disposed thereon for horizontal rotation, a cam member 218 is provided to abut the inner face of the arm 215. The cam member may be turned about its vertical axis by suitable means, such as a vertical extension shaft 220, carrying a graduated disc 221 at its upper end and provided with a central slot 222 to receive a screw driver or the like. With the parts constructed so that the U-spring 215—216 is conveniently under such tension as to bias its arm 215 firmly against the edge of the cam element 218, and so that the coil spring 208 is preferably under at least some tension at all times, the actual tension of the coil spring 208 may be adjusted by rotating the cam, through the instrumentalities described, so as to move the arm 215 in a direction away from or toward the drum 205.

It will now be seen that expansions and contractions of the bellows 120 effect corresponding movement of the lever 145, as in the structure of Figs. 1 to 5. Movement of the lever 145 in one direction (e. g., outwardly or upwardly as seen in Fig. 7) pulls the wire 206 and correspondingly turns the pointer 164. Upon movement of the lever in the other direction, the spring 208 acts to pull the wire 207, and correspondingly deflects the pointer 164 the other way. The arrangement of this embodiment thus affords, in a very similar fashion to the previously described structures, a simple and remarkably sensitive barometer movement, which is extremely accurate and which affords an immediate response to atmospheric or like pressure changes, without tapping or other delayed action. It will be seen that adjustment of the tension of spring 208 by turning the cam 218 may be readily effected to afford optimum response for the indicator arm assembly, i. e., to avoid undesirable back lash or play, and at the same time to permit immediate and highly sensitive response to displacements of the lever 145.

Suitable guard structure, for purposes explained in connection with Figs. 1 to 5, may be provided for the lever 145. Although various forms, such as those shown in Figs. 1 to 3 inclusive may be employed, a simple arrangement includes the vertical plate 230 mounted on the base 128 (see Figs. 7, 8 and 10), and having a horizontal slot or notch 231 within which the outer end of the lever 145 is free to swing without touching the top or bottom of the slot in normal use of the instrument.

Although the various wires or filamentary connections (58, 70, 73, 75, 100, 206, 207) shown in the several embodiments may be made of any suitable materials, I prefer to employ a strong non-corrosive metal ribbon having a thickness of about 0.0005 of an inch and a width of about 0.007 of an inch, and which may desirably have a substantial resilience and which preferably is such that it will take no permanent set. Examples of such ribbon (or wire) are the types of filament, made of 14 kt. gold or like alloy, used for galvanometer suspensions. It will be understood that means may be provided to compensate for the effects of temperature changes in the apparatus; for instance, a generally satisfactory arrangement of a simple sort is to include a small amount of air in the elastic box or bellows 20, 120, in a manner which will be understood by those familiar with the construction of aneroid barometers.

It will now be seen that the invention affords a peculiarly efficient, sensitive and rapidly responsive movement for an instrument of the character of an aneroid barometer, where it is desired to translate, for example into movements of an indicating pointer, control displacements which involve relatively considerable force but which are of an extremely minute extent. Aneroid barometers constructed according to the invention may be employed to great advantage for the various uses to which such barometers have hitherto been adapted, and indeed are of special advantage for many purposes, for example in map-making surveys, to determine small changes of elevation, a purpose for which many prior types of instruments have been relatively unsatisfactory.

It will be understood that the invention is not limited to the structures and arrangements herein illustrated and described, but may be embodied in other forms, combinations or devices, without departure from its spirit as defined by the following claims.

I claim:

1. In apparatus of the character described, in combination, a pressure-sensitive bellows, a lever, means extending from the opposite sides of said bellows respectively to spaced points on said lever and including fastened resilient connecting means, for swinging said lever in accordance with operation of the bellows, a device movable about an axis, means including filament means extending from a point on said lever remote from the aforesaid points to a point on said device offset from its axis, for swinging said device in accordance with movements of the lever, tensioned spring means extending at one end to a point on said device offset from its axis, for causing said device to follow lever movements in either direction, means fastening the other end of said spring means, and rotatably adjustable cam means for displacing said last-mentioned fastening means, to adjust the position of said device relative to the controlling position of the bellows.

2. In apparatus of the character described, in combination, pressure-responsive means including a pair of members of which one is movable relative to the other, a lever, means including flexible connections fastened to said members and said lever, for supporting said lever and swinging the same in accordance with relative movement of said members, a device movable about an axis, means including a flexible connection fastened to a point on said lever remote from said first mentioned connections and extending to a point on said device offset from its axis, for transmitting movements of said lever to said device, and means mounting said pair of members, lever and lever-supporting means, for displacement in unison relative to said device, to afford adjustment of the angular position of said device relative to the position of the lever.

3. In apparatus of the character described, in combination, a control member adapted to exhibit minute displacements, lever means, means including flexible connecting means fastened to said lever means and said control member, for supporting said lever means and connecting same to said control member independently of bearing surfaces, and a movable device having substantially play-free connection to said lever means, whereby said device is adapted to be shifted in immediate response to the aforesaid displacements as amplified by the lever means, said lever means having a bifurcated portion remote from the said connecting means to the control member, and the aforesaid play-free connection to the movable device including filament means stretched and fastened across said bifurcated portion and a member fastened to an intermediate point of said filament means and to the movable device, to tie the filament means to the movable device and to transmit thereto the movements of the lever means.

4. In apparatus of the character described, in combination, a pressure sensitive bellows, a stud fastened to one face thereof, a U-member having one arm fastened to the opposite face of the bellows and having another arm extending close to said stud, a lever, a pair of resilient members fastened to closely spaced points on said lever and respectively to said stud and said second-mentioned arm of the U-member, said stud and second-mentioned arm being disposed close together on the same side of the lever and said resilient members being stiff for wholly supporting said lever, a pointer device adapted to swing about an axis, and means fastened to said lever at a place remote from said points and including flexible connecting means, for transmitting movements of said lever to said device substantially independently of bearing friction.

5. In apparatus of the character described, in combination, lever means, pressure-responsive means for swinging displacement of said lever means, a filament, said lever means including means fastening the ends of said filament thereto with the filament stretched in a direction at an angle to the path of swing of the lever means, a device adapted to swing about an axis in a path substantially parallel to the path of swing of said lever means and including a second filament which has its ends fastened to said device and is stretched in a path eccentric of said axis and at an angle to the path of swing of said device, and a rigid connecting member fastened at its ends respectively to central points of said filaments.

6. In apparatus of the character described, in combination, a pair of adjacent control members of which one is adapted to move relative to the other, a lever, means wholly supporting said lever from said members and comprising stiff, flexible force-transmitting members immovably connected to said control members respectively and to said lever at spaced points, whereby relative movement of said members is positively converted into swinging movement of said lever, said flexible members having sufficient stiffness to provide jointly said whole support for said lever and to effect positive movement of said lever in either direction, indicating means mounted to swing about a predetermined axis, and connecting means disposed intermediate a point on said lever remote from the aforesaid force-transmitting members and a point on said indicating means offset from the axis thereof, including substantially play-free means for transmitting force through said connecting means from said lever to said indicating means.

7. In apparatus of the character described, in combination, a movable member, a fixed member, a lever, means flexibly mounting said lever to said members, for supporting said lever to be swung by said movable member, a device movable about an axis, and means attached to said lever for connecting the device to be moved by the lever, said last-mentioned means comprising a connecting member extending between said lever and said device, a pair of torsionally yieldable filaments respectively fastened at intermediate points thereof to opposite ends of said connecting member, means attaching and stretching one of said filaments by its ends to said lever, and means attaching and stretching the other of said filaments by its ends to said device and in a position offset from the axis of said device, whereby movements of said lever are transmitted to said device without appreciable play or bearing friction.

8. In apparatus of the character described, in combination, a movable member, a fixed member, a lever, means flexibly connecting said lever to said members, for supporting said lever to be swung by said movable member, a device movable about an axis, and means attached to said lever for connecting the device to be moved by the lever, said last mentioned means comprising drum means carried by said device coaxially therewith, filament means fastened to the lever and extending around and fastened to said drum means, whereby displacement of the lever in one direction causes rotation of said drum means and said device in a corresponding direction, resilient means connected to said drum means for rotating said device in a reverse direction upon displacement of the lever oppositely to the first-mentioned direction, said resilient means comprising a tensioned spring having one end connected to said drum means, a securing member fastened to the other end of said spring, and cam means for displacing said securing member, to adjust the tension of said spring and thereby adjust the position of the movable device relative to the position of the first-mentioned movable member.

9. In apparatus of the character described, in combination, a movable member, a fixed member, a lever, means flexibly connecting said lever to said members, for supporting said lever to be swung by said movable member, a device movable about an axis, means attached to said lever for connecting the device to be moved by the lever, and means for moving said movable member and said fixed member together relative to the axis of the movable device, for calibrating adjustment of the position of said device relative to a given position of the movable member.

10. In apparatus of the character described, in combination, means comprising a pressure sensitive device and a pair of control members secured to relatively movable sides of the device, for converting changes of pressure into minute relative displacements of said control members, a lever, stiff spring means fastened to said lever at one part thereof and fastened to said control members, for supporting said lever from said control members and for moving the lever in response to relative displacements of the control members, said spring means being constructed and arranged sufficiently stiff to provide the sole support for the lever and positively to displace the lever in either direction by tension and compression, and said lever being thereby adapted to convert relative displacements of said control members into amplified displacements of a remote part of the lever, and a movable device operated by the lever at its said remote part, and thereby adapted to be shifted in response to the said amplified displacements.

11. In apparatus of the character described, in combination, a pressure sensitive bellows, a stud fastened to one face thereof, U-shaped structure having an arm fastened to the opposite face of the bellows and having another arm extending close to said stud, a lever, a pair of resilient members fastened to closely spaced points on said lever and respectively to said stud and said second-mentioned arm of the U-shaped structure, said stud and second-mentioned arm being disposed close together on the same side of the lever and said resilient members being stiff for wholly supporting said lever, and a movable device operated by said lever at a point on the latter remote from the connection of said resilient members, said device being thereby displaced in accordance with relative displacements of said stud and second-mentioned arm.

12. The apparatus of claim 11, which includes supporting structure on which the movable device is movably mounted for displacement by the lever as aforesaid, and which includes means displaceably mounting said U-shaped structure on the supporting structure, to afford simultaneous positional adjustment of the U-shaped structure, bellows and lever, and thereby to effect adjustment of the position of the movable device relative to the pressure-controlled positional condition of the aforesaid stud and second-mentioned arm, the bellows being carried by the U-shaped structure.

13. In apparatus of the character described, in combination, a movable member, a fixed member, a lever, means flexibly mounting said lever to said members, for supporting said lever to be swung by said movable member, a device movable about an axis, and means attached to said lever for connecting the device to be moved by the lever, said device having associated means suspending and supporting the device for free, substantially unbiased rotation, said last mentioned means including a flexible rectilinear filament constituting the axis about which said device is movable, and said connecting means comprising tensioned flexible force-transmitting means for tying said device to said lever, to transmit movements of said lever to said device without appreciable play or bearing friction.

14. In apparatus of the character described, in combination, a pressure-sensitive device adapted to convert changes in pressure into minute displacements, lever means for amplifying said displacements, movable indicating means including flexible connecting means fastened to said lever means and said indicating means, for response, substantially independent of bearing friction, to the amplified displacements of the lever means, said lever means being carried in part by said pressure-sensitive device, and means mounting said pressure-sensitive device and lever for displacement in unison and without appreciable mutual displacement, to effect adjustment of the position of the indicating means relative to the pressure-controlled position of displacement of the pressure-sensitive device.

15. In apparatus of the character described, in combination, a pressure-sensitive bellows, a displacement-amplifying member, a pair of means each comprising a stiff resilient member, rigid means connecting each of said stiff resilient members to the opposite sides of said bellows respectively, said stiff resilient members being respectively fastened to closely spaced points on said displacement-amplifying member and capable of moving said displacement-amplifying member by both tension and compression, the aforesaid parts being so constructed and arranged as to provide substantially the sole support for said displacement-amplifying member and to provide means for positively imparting movement thereto in both directions in response to mutual displacement of the opposite sides of said bellows, and means associated with the end of said displacement-amplifying member remote from that to which said stiff members are connected for indicating the mutual displacement of the sides of said bellows.

CHARLES FREDERICK WALLACE.